Jan. 3, 1939.  W. W. GETZ  2,142,815
WEDGE TYPE GEARLESS STOKER DRIVE
Filed Jan. 6, 1938  2 Sheets-Sheet 1
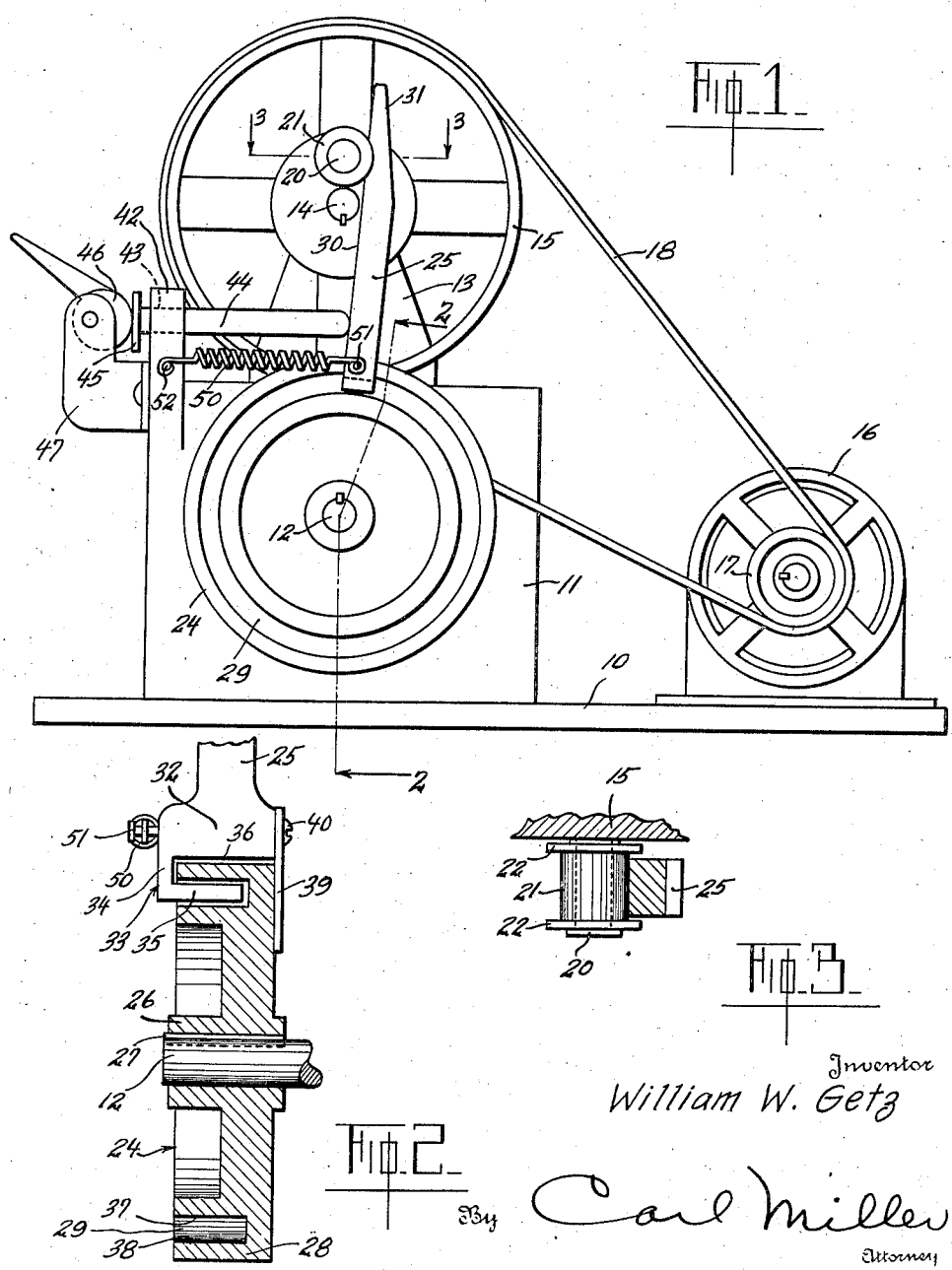
Inventor
William W. Getz
By Carl Miller
Attorney Jan. 3, 1939.  W. W. GETZ  2,142,815
WEDGE TYPE GEARLESS STOKER DRIVE
Filed Jan. 6, 1938   2 Sheets-Sheet 2

Inventor
William W. Getz
By Carl Miller
Attorney

Patented Jan. 3, 1939

2,142,815

UNITED STATES PATENT OFFICE 2,142,815

WEDGE TYPE GEARLESS STOKER DRIVE

William W. Getz, Morton, Ill.

Application January 6, 1938, Serial No. 183,631

1 Claim. (Cl. 74—116)

This invention relates to a wedge type gearless intermittent stoker drive.

The object of the invention is to provide an intermittent feed control mechanism to the worm conveyor of a stoker which is simple and efficient, comprises a minimum of parts, all of which is inexpensive, simple to install, and efficient in service.

Another object of the invention relates to achieving the intermittent feed control to the worm conveyor by coacting wedging members whereby for each revolution of a driving means there will be a uniform turning movement of the coacting wedging members.

These and other objects will hereinafter be more fully explained, reference being had to the accompanying drawings forming a part of this specification, and in which like characters will apply to like parts in the different views, and in which:—

Figure 1 is a front elevational view of the stoker drive mechanism.

Figure 2 is a detail sectional view taken on line 2—2, Figure 1.

Figure 3 is a detail sectional view taken on line 3—3, Figure 1.

Figure 4:
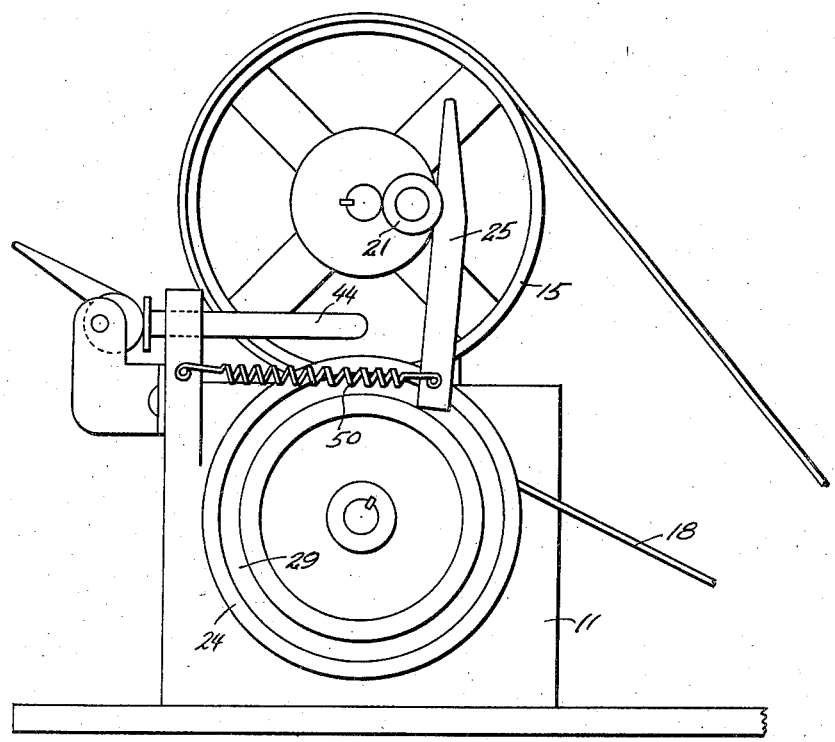
Figure 4 is a front elevational view of the stoker drive mechanism showing relationship of parts in one phase of its operation.

Referring again to the drawings and particularly to Figure 1, the stoker drive mechanism comprises a base 10 on which is supported one end of a woven conveyor housing 11 in which the worm conveyor (not shown) is mounted on the shaft 12, in the manner well known. The feed hopper and connection of the housing to the furnace form no part of the invention and are accordingly not shown. Supported on the top of the housing 11 is a pedestal 13 on which is suitably mounted for rotational movement a pulley shaft 14 carrying a pulley 15. Positioned on the base 10 adjacent the housing 11 is an electric motor 16 provided with a drive pulley 17, operatively connected with the driven pulley 15 by a belt 18.

Eccentrically mounted on a stub shaft 20 on the pulley 15 is a roller 21 provided with a flange 22 at each end thereof, see Figure 3, for a purpose to be hereinafter described.

The intermittent turning movement applied to the conveyor shaft 12 is obtained through the co-action of a stoker drive wheel 24 fixedly mounted on the shaft 12 exteriorly of the housing 11 and a wedge carrying arm 25. The drive wheel 24 comprises a hub 26 secured to the shaft 12 by a key 27, and a comparatively thick and wide rim 28 provided on its outer side with a deep annular groove 29. The arm 25 is preferably formed as a solid bar rectangular in cross section, one side of which is straight and flat as at 30 while the opposite side 31 is tapered as shown. The lower end of the arm 25 is laterally enlarged as at 32 and integrally formed therewith at its outer side is a depending L-shaped lug 33 comprising a vertical portion 34 and a horizontal portion 35 parallel to the base 36 of the arm. The horizontal portion 35 constitutes a locking or wedging member formed of substantial width so as to snugly fit within the annular groove 29 and at the same time to normally be out of engagement with the concentric annular surfaces 37 and 38 of the annular groove when placed in its proper inoperative position with relation to the drive wheel 24 as will be hereinafter described. On the other side of the enlarged end 32 of the arm 25 there is provided a retaining plate 39 which is secured in position by the screw or screws 40, said plate functioning to hold the arm 25 in operative position at all times with respect to the drive wheel 24, as clearly shown in Figure 2.

Referring to Figure 1 it will be seen that the axis of the drive wheel shaft 12 and the pulley shaft 14 are in the same vertical plane. The arm 25 is assembled on the drive wheel 24 in the manner as described above, the upper end of the arm being then received between the flanges 22 of the roller 21 with the axis of the roller in the same vertical plane with the shafts 12 and 14. This position of the arm is the normal inoperative position thereof prior to being actuated for moving the drive wheel 24.

Formed on the housing 11 in opposed relation to the arm 25 is a bracket 42, provided with a horizontal guide opening 43 in which is slidably positioned an abutment rod 44, one end of which is adapted to be engaged by the arm 25. The other end of the rod 44 is provided with a head 45 arranged to be engaged by an adjusting eccentric cam 46 pivotally mounted on the bracket 47. Suitable locking means (not shown) may be provided for locking the cam 46 in its adjusted position. Movement of the rod 44 by the cam 46 towards or away from the arm 25 will control the angular or rotary movement of the drive wheel 24. A tension coil spring 50 is connected at one end to a pin 51 on the arm 25 and at its other end to a pin 52 on the bracket 42, said spring 50 acting as a spring return means for the arm from its furthermost position of throw (Figure 4) back to its normal position (Figure 1).

Figure 5:
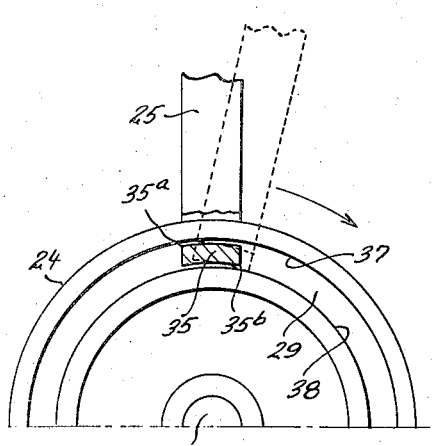
Figure 5 is a detail view illustrating the manner in which the wedge arm operates the stoker drive wheel.

The operation of the mechanism is as follows:— Upon rotation of the driven pulley 15 by the belt 18, the roller (moving in a clockwise direction viewing Figure 1) will tilt the arm 25 forwardly which movement will also tilt the locking member 35, see dotted line position Figure 5, so that the diagonally opposed corners 35a and 35b thereof will respectively frictionally engage the annular surfaces 37, 38 of the annular groove 29 to thus affect a locking engagement of the arm 25 with the drive wheel 24. Further movement then of the roller 21 will force the arm 25 locked to the drive wheel 24 to be moved forwardly thus turning the drive wheel 24 about its axis. The throw of the arm 25 takes place through a 45 degree movement of the roller 21 from its initial position see Figure 1, to the position thereof shown in Figure 4. Beyond this position the roller 21 will move away from the arm 25, which is then (breaking its locked relation) pulled back to its initial position in abutting engagement with the rod 44 by the spring 50. Adjusting the position of the rod 44 will obviously adjust the initial position of the arm 25 thus varying the amount of angular movement of the drive wheel 24. Thus for each rotation of the pulley 15, the drive wheel 24 will be given a partial turn in a clockwise direction for actuating the worm conveyor. This operation is similar to a pawl and ratchet action.

It is to be understood while this mechanism has been shown utilized with a stoker drive that the same is applicable to all purposes for which a similar pawl and ratchet action is applicable.

Having thus described my invention, what is claimed is:—

An intermittent stoker drive mechanism for a worm conveyor type of stoker provided within a housing and mounted on a shaft therein; comprising a driving wheel mounted on the shaft of said conveyor, a pulley mounted on said housing above said conveyor, the axis of rotation thereof and the axis of said shaft being in the same vertical plane, drive means connected to said pulley, an annular groove formed in said drive wheel, a roller eccentrically supported by said pulley, an arm engaging said roller at its upper end, a locking member carried by the lower end of said arm fitted within said annular groove, a bracket on said housing, spring means connected to said arm said bracket for maintaining said arm in engagement with said roller and for returning said arm to its initial position when moved by said roller to its maximum outermost position, and adjustable abutment means for determining the amount of movement of said arm, said roller for each rotation of said pulley acting to tilt said arm whereby to force said locking member into engagement with the walls of said annular groove to turn said drive wheel through a predetermined angular distance, said adjustable abutment means comprising a second bracket mounted on said housing, an abutment rod slidable in said first-mentioned bracket, a cam pivoted on said second bracket, said cam engaging said rod for adjusting the latter in said first-mentioned bracket, said rod remaining stationary in its adjusted position.

WILLIAM W. GETZ.